United States Patent [19]
Beaton et al.

[11] Patent Number: 5,837,314
[45] Date of Patent: Nov. 17, 1998

[54] METHOD AND APPARATUS FOR APPLYING A SURFACTANT TO MOLD SURFACES

[75] Inventors: Stephen Robert Beaton, Neptune Beach; Wallace Anthony Martin, Orange Park, both of Fla.; Ture Kindt-Larsen, Holte, Denmark; Craig William Walker; Gregory Scott Duncan, both of Jacksonville, Fla.

[73] Assignee: Johnson & Johnson Vision Products, Inc., Jacksonville, Fla.

[21] Appl. No.: 431,612

[22] Filed: May 1, 1995

Related U.S. Application Data

[63] Continuation-in-part of Ser. No. 258,263, Jun. 10, 1994, Pat. No. 5,542,978.

[51] Int. Cl.$^6$ .................................. B05C 1/00; B05D 3/02
[52] U.S. Cl. .......................... 427/133; 427/135; 427/384; 118/256; 118/263; 118/264; 118/268; 264/90; 264/338
[58] Field of Search .................................... 118/256, 263, 118/264, 268; 427/133, 135, 384; 264/338, 90

[56] References Cited

U.S. PATENT DOCUMENTS

| | | | |
|---|---|---|---|
| 4,064,208 | 12/1977 | Hanning | 264/338 |
| 4,159,292 | 6/1979 | Neefe | 264/1 |
| 4,640,489 | 2/1987 | Larsen | 249/122 |
| 4,680,336 | 7/1987 | Larsen et al. | 524/548 |
| 5,039,459 | 8/1991 | Kindt-Larsen et al. | 264/2.6 |
| 5,264,161 | 11/1993 | Druskis et al. | 264/2.6 |

FOREIGN PATENT DOCUMENTS

| | | | |
|---|---|---|---|
| 0251367 | 1/1988 | European Pat. Off. | 264/338 |
| A-93 0484 | 3/1993 | WIPO . | |

OTHER PUBLICATIONS

Patent Abstracts of Japan, vol. 94, No. 010, & JP-A-06 285831 (Kao Corp), Oct. 11, 1994 (abstract).
Patent Abstracts of Japan, vol. 017, No. 038 (M-1358), 25/1/93 & JP-A-04 258366 (Akizo Sato), (abstract) Sep. 14, 1992.

*Primary Examiner*—Janyce Bell

[57] ABSTRACT

A method of and apparatus for employing a surfactant which is provided in order to assist in the release from each other of mold components of a multi-part mold employed in the molding of polymeric articles; for instance, such as a hydrophilic contact lens, upon completion of the molding process for the polymeric articles. The surfactant is applied in the form of a film or coating on surface portions of one of the mold components in order to facilitate the disengagement between the mold components during demolding, and the removal of excess polymeric molding material adhesively deposited on surfaces thereon.

37 Claims, 5 Drawing Sheets

METHOD AND APPARATUS FOR APPLYING A SURFACTANT TO MOLD SURFACES

CROSS-REFERENCE TO RELATED APPLICATION

This application is a continuation-in-part patent application of Ser. No. 08/258,263; filed Jun. 10, 1994 now U.S. Pat. No. 5,542,978.

BACKGROUND OF THE INVENTION

1. Field of the Invention

The present invention relates to a method of employing a surfactant which is provided in order to assist with the release from each other of mold components of a multi-part mold employed in the molding of polymeric articles; for instance, such as hydrophilic contact lenses, upon completion of the molding process for the polymeric articles.

The method pursuant to the invention also contemplates the application of the surfactant in the form of a film or coating on surface portions of one of the mold components in order to facilitate the disengagement between the mold components during demolding, and the removal of excess polymeric molding material adhesively deposited on surfaces thereon; which, for example, may be in the shape of rings formed externally of the respective mold cavities for the contact lenses, and which are formed through the displacement of polymeric material from the mold cavity.

Moreover, pursuant to a further aspect of the invention, there is provided a novel and unique apparatus which is adapted to effectuate the application of a coating or film containing a surfactant to surfaces of mold components for molding hydrophilic polymer articles, especially such as hydrophilic contact lenses or the like. Accordingly, any excess molding material encountered during the molding of the contact lenses which is expelled from the mold cavities and resultingly adhesively deposited in the shape of rings on surface portions between the mold components located externally about the mold cavities, can be easily and cleanly removed upon heat separation of the mold components in view of the presence of the surfactant coating or film. This also facilitates the essentially undamaged removal of the molded articles from the mold cavities during separation of the components thereof upon completion of the molding process for the articles.

An extensive array of methods is currently employed in this technology in carrying out the manufacture of hydrophilic polymer articles, such as hydrophilic contact lenses, through the implementation of a considerable variety of processes; among which there are included spin casting, static cast molding, lathing, combinations of casting and lathing, and particularly frequently, through the use of two-part molds. In the utilization of separable two-part molds for the molding of hydrophilic contact lenses, upon completing the molding step it is of critical importance to be able to release the hydrophilic contact lenses from their surface engagement with and adherence to the mold parts, or at least one of the mold halves, without causing any damage to the contact lenses upon separating the mold parts, which would render the lenses unusable. Various concepts employed for effectuating the release of hydrophilic contact lenses from surfaces of molds, particularly two-part molds which are intended to be physically separated, are through the employment of laser or infrared heat mold part separating devices, the use of external heat and/or the application of heated gas, hot air or steam. However, all too frequently, damage is sustained by the contact lenses during removal thereof from the molds in that the material of the mold parts may exhibit a tendency to adhere and inhibit easy release upon effectuating separation of the mold parts. This potential damage which generally renders the contact lenses unable to meet necessary quality and/or inspection standards may consist of tears, nicks or other surface defects formed in the contact lenses, prevalent of which there may be the so-called "piece of material" (POM) defects caused by excess polymer debris or particles produced during molding permanently adhering to the contact lenses upon mold separation.

Generally, such mold parts for hydrophilic contact lenses consist of a curvilinear (concave/convex) center or front curve mold part adapted to form, in cooperation with a mating base mold curve part, a two-part mold for the contact lenses. Hydrophilic contact lenses of the type considered herein are usually constituted from a hydrophilic polymer, preferably a HEMA-based polymer (hydroxyethyl methacrylate), although other suitable monomers may comprise hydroxy ethyl acrylate (HEA), hydroxy propyl methacrylate, hydroxy propyl acrylate and hydroxy trimethyl ethylene acrylate, among numerous other applicable materials.

The components of the mold within which the hydrophilic polymer contact lenses are molded may consist of suitable pallets each including a plurality of cavities receiving mold parts having female and/or male base surfaces or curvilinear wall portions for the formation of the curved contact lenses and an annular rim portion extending thereabout. The molds as described, for instance in the molding technology, may be constituted from suitably selected conventional plastic materials, whereby the hydrophilic polymer articles; i.e. the contact lenses, will possibly adhere to one of the mold parts through the presence of mold parts having different properties or being formed of different materials. The mold parts may consist of plastic materials such as polyethylene, polypropylene, polystyrene, polyvinyl chloride among other suitable plastic mold materials, as is known in the technology.

In order to remove the molded hydrophilic contact lenses from the respective mold cavities, separation of the mold halves or portions is implemented, and the formed contact lenses may then be removed from the mold cavities. Due to excess portions of the polymeric material of the hydrophilic contact lenses which are expelled from the mold cavities of the cooperating mold components, and which form ring-shaped elements of the preferably HEMA-based polymer from which the contact lenses are made surrounding the exteriors of the mold cavities, and exhibit tendencies to strongly adhere to the mold surfaces on which the rings are deposited. These rings make separating of the mold cavities difficult, resulting in mold breakage and damage to the lenses. Further, the rings, or fragments thereof, become uncontrollable debris in automated production lines, contaminating both the production line and the final lens package. Moreover, the foregoing can also conceivably cause a perfectly "good" contact lens to be rejected after demolding due to the formed HEMA-ring or a portion thereof remaining on the front curve of the mold. This results in uneconomical production conditions being encountered during the manufacture of such contact lenses.

2. Discussion of the Prior Art

In order to implement the high-speed and mass-produced molding of such hydrophilic contact lenses, there have been developed two-part molds incorporating pallet-supported mold structures; for example, as disclosed in U.S. Pat. No. 4,640,489 to Larsen, and wherein methods of forming shaped polymeric hydrogel articles, such as hydrophilic contact lenses, are also elucidated in the disclosures of U.S. Pat. Nos. 4,680,336 and 5,039,459 to Larsen et al., wherein the last-mentioned two patents are assigned to the common assignee of the present application and the disclosures of which are incorporated herein by reference.

The release of hydrophilic contact lenses from adherent mold surfaces subsequent to the completion of the contact lens molding process can be facilitated or improved upon, as is set forth in the disclosure of U.S. Pat. 5,264,161 to Druskis et al. In that instance, surfactants are introduced in solution into a hydration bath employed in the molding cavities for molding the hydrophilic polymeric structures or contact lenses. The surfactant which is dispersed in the hydration bath in concentrations not exceeding 10% by weight aids in facilitating release of the lenses from adherent contiguous mold surfaces being separated, with the function of such surfactant being to reduce the surface tension properties of water or liquids, and to thereby reduce the level of adherence between components consisting, on the one hand, of the contact lenses and, on the other hand, the mold surfaces which become adherent during molding. Numerous types of surfactants are disclosed in this patent publication, particularly such as polymeric surfactants including polyoxyethylene sorbitan mono-oleates, and which are especially suitable for releasing in an undamaged state any hydrophilic polymer articles from adherent mold surfaces which are constituted of plastic materials. Nevertheless, the utilization of surfactants in suspension in a liquid hydration bath does not provide the desired control over the release of the hydrophilic polymer articles or contact lenses from the mold surfaces prior to hydration in the bath and, in particular, does not readily afford an easy removal of HEMA-based rings of molding material formed in adherence with mold surfaces extending about the mold cavities, or a more effortless separation between the mold component, whereby the rate of damage being encountered by the contact lenses upon mold separation and removal from the molds is still unacceptably high and is not readily controllable to a degree affording a satisfactory economic manufacturing environment.

SUMMARY OF THE INVENTION

Accordingly, in order to improve upon the ability of such hydrophilic polymeric articles, especially hydrophilic polymer contact lenses, of being inherently releasable in an undamaged state from the mold cavities of mold structures in which they are molded, the present invention contemplates the provision of a stamping station in a mold filling and assembling machine for the formation of hydrophilic polymer contact lenses which are ordinarily constituted from a HEMA-based plastic material, wherein a plurality of stamping heads each includes at least one stamp for applying a thin layer or film of a polymeric surfactant; in this instance, preferably a polyethylene oxide sorbitan mono-oleate, commercially sold under the tradename "Tween 80", to surface regions extending about the front curve of a mold part for the forming of contact lenses. This surfactant layer, in essence, assists in the separation of a mold part defining a base curve adapted to matingly cooperate with a second mold part defining the front curve for molding a contact lens, and in the removal of excess molding material forming a HEMA-based ring extending externally of the mold cavity for each contact lens from any potential adhesion to the surfactant-coated mold part surface during demolding of the lens.

Pursuant to the invention, the novel stamping station which provides for the application of a thin layer of the polymeric surfactant to the surface portions extending about the front curve of the mold part, such as a flange surface, contemplates the positioning of at least one mold pallet or a pair of mold pallets containing the front curves of a two-part mold (which are adapted for subsequent mating with mold parts for molding the contact lens base curves) directly beneath a stamping head consisting of a plurality of stamps each of which is adapted to engage respectively one of the surfaces or flange portions extending about the front curves located on the mold pallet or pallets. A pad arrangement which comprises a reservoir of the surfactant; for instance, a polymeric surfactant such as Tween 80, includes a plurality of discrete pads adapted to be moved beneath the stamping head and permitted to remain there while the stamps of the stamping head are moved downwardly into contact with each therewith associated pad, and then retracted upwardly to allow the pad to be moved out from beneath the stamping head. The foregoing contacting between the stamps of the stamping head and the therewith aligned surfactant-impregnated pad arranged in the surfactant reservoir resultingly causes each stamp to be wetted with the surfactant; in effect, the Tween 80 surfactant. Thereafter, the stamping head is moved downwardly towards the mold pallet or pallets so as to enable the stamps to each respectively contact a therewith aligned surface or flange extending about a respective front curve positioned on the mold pallet, thereby depositing a very thin layer or film of the surfactant of controlled thickness onto the surface about each respective front curve. The stamping head with the stamps is then retracted upwardly and the machine sequences to the next mold pallet or pair of pallets of front curves of a two-part contact lens mold while concurrently advancing the preceding surfactant-coated front curves on their mold pallet or pallets towards a station of the machine in which there is implemented the assembly of the back curve onto the front curve.

Pursuant to a specific aspect of the invention, the discrete pads for enabling the stamps to be wetted with the surfactant includes an upwardly opened reservoir extending substantially across the full width of the collective stamps, and whereby each of the individual or discrete pads is adapted to be at least partly immersed in surfactant in the reservoir so as to absorb the surfactant and enable to be wicked upwardly through each of the pads. A cover plate sealingly covers the upwardly opened area of the reservoir and has a plurality of apertures formed therein commensurate with the number of pads and associated stamps adapted to contact the latter, so as to form a sealing cover structure preventing any of the surfactant from spilling out of the reservoir. This is effectuated in that a seal is interpositioned between the perimeter of the reservoir and the lower surface of the cover plate, and the apertures in the cover plate contact the circumferential edges of each of the pads along their upper surfaces. In order to enable visual inspection of the reservoir so as to be able to ascertain the level or quantity of surfactants contained therein, at least portions of the surface portion of the cover plate, the latter of which is generally constructed of a metallic material, may be constructed from a transparent material, preferably such as Lexan (registered trademark).

The application of a uniform thin layer or film of the surfactant to the various flange surfaces extending about each front curve of which the molding cavity has previously been filled with HEMA molding material for the contact lens and then subsequently matingly engaged by an associated base curve mold part after applying the surfactant, and on which flange surfaces there are deposited and adhered thereto HEMA-based rings of excess material from the molding material for each of the contact lenses, facilitates that subsequent to molding each contact lens can be removed from the respective mold cavity thereof during separation of the mold parts. The layer of surfactant which is applied or stamped onto the flange surface of the front curve may preferably, although not necessarily, be within the range of about 0.05 to 0.50 mg of surfactant for each front curve. This separation of the mold parts; in effect, between the front curves and base curves, is rendered easier due to the presence of the surfactant layer between the engaged circumferential edge surfaces of the respective front curve and base curve mold parts. Moreover, the surfactant on the flange or surface portion of the front curve mold part to which the HEMA-based ring of excess contact lens molding material expelled from the mold cavity adheres, reduces the degree of adhesion and enables the ready removal of the HEMA-based ring from each respective surface about the front curve, which during demolding results in a better than 95% removal rate of the HEMA ring without any damage being encountered by the contact lenses.

In accordance with another advantageous feature of the invention, the stamping head provides for a resiliently mounted multiple stamp structure enabling each individual stamp to "float" or be shiftable to some extent independently of the displacement of the other stamps in view of a spring-biased mounting construction for each stamp. This, in effect, will ensure that an even amount of pressure is applied to the surfaces or flanges extending about each front curve supported on the mold pallet upon being contacted by a respective stamp having a surfactant-wetted surface previously imparted thereto by the pad, so as to cause a uniformly thick layer or film of an equal amount of surfactant to be applied about each of the respective front curves.

As set forth herein, in accordance with a specific aspect of the invention, as contained in the reservoir in a predetermined discretely spaced position, each pad for applying the surfactant to an associated one of the stamps of the stamping head may utilize a material structure to constitute a substantially porous pad; for example, a polyethylene pad; each pad preferably, although not necessarily, being an essentially cylindrical member of a surfactant-absorptive material which is intended to absorb surfactant from the reservoir and wick it towards the top of the respective pad when the latter is contacted by the downwardly displaced stamps during application or wetting with surfactant. A nylon filter, for instance, having a mesh size within the range of about 0.50 to 2.0 microns, and preferably of a 1.2 micron mesh size, is supported on the top surface of respectively each porous pad, and acts as a metering device so as to permit only a very minor quantity of the surfactant to pass therefrom through the nylon membrane filter to the contacting surfaces on the stamps of the stamping head for forming a thin surfactant layer or wetted surface thereon. This enables for highly precise control to be exercised over the amount of surfactant being passed through the nylon filter to the stamps and, thereafter upon withdrawal of the pad, to be subsequently deposited by the stamps on the surfaces or flanges extending about the front curves which are positioned on the mold pallet.

In comparison with the prior art, such as is represented by U.S. Pat. No. 5,264,161 to Druskis et al., which only discloses utilizing surfactants which are in suspension in a bath solution for improving upon the release of molded polymer articles from molds during separation, the present invention provides an improved control over the amounts of surfactant being in a novel manner distributed over and deposited on the applicable surface areas about the front curve mold part, thereby enabling removal of HEMA-based rings of molding material adheringly deposited about the front curves, with only a minimal danger of damage to the lenses being encountered, thereby also rendering the entire procedure and apparatus highly cost effective and economical in the manufacture of contact lenses of uniformly high quality.

Accordingly, it is an object of the present invention to provide an arrangement for depositing controlled amounts of a surfactant on mold surfaces to facilitate the separation of the mold parts, such as between front curves and base curves, enabling the removal of HEMA-based rings of excess molding material adhering to mold surfaces about the front curves, and thereby essentially eliminating contamination of the production line and the packages upon completion of the lens molding procedure.

Another object of the present invention resides in the provision of a method for depositing thin films of surfactants on mold part surfaces to assist in the separation during demolding of the mold parts, such as between front curves and base curves utilized for the molding of contact lenses, enabling the removal of HEMA-based rings of excess molding material adhering to mold surfaces about the front curves, and facilitating an essentially undamaged release of the molded contact lenses, utilizing the arrangement as described herein.

BRIEF DESCRIPTION OF THE DRAWINGS

Reference may now be had to the following detailed description of an exemplary embodiment of a stamping arrangement utilized for the application of a polymeric surfactant to surface portions extending about the front curves of a mold structure for molded polymeric articles, particularly such as hydrophilic polymer contact lenses, facilitating separation of the mold parts and removal of any HEMA-based rings of molding material adhering thereto, taken in conjunction with the accompanying drawings; in which.

DETAILED DESCRIPTION

Figure 1:
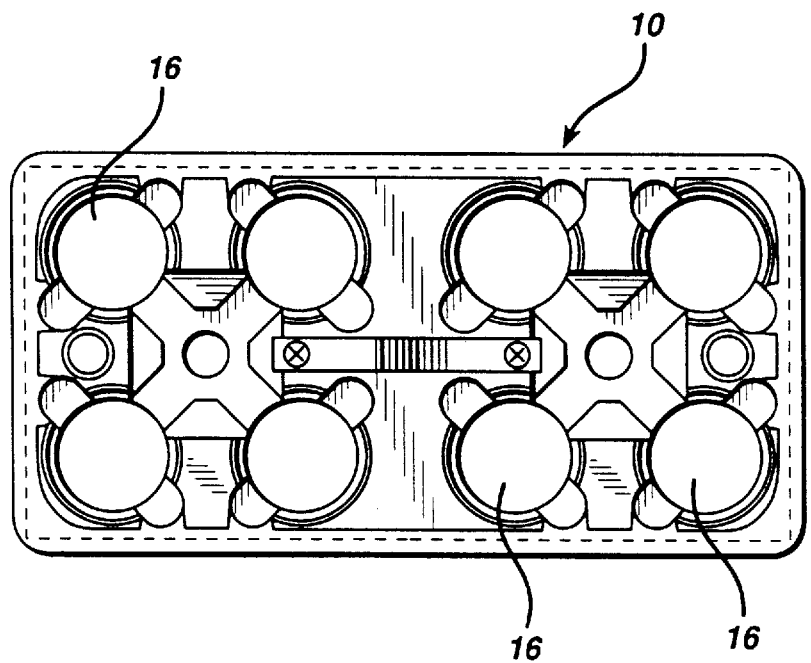
FIG. 1 illustrates a top plan view of a typical mold pallet of a two-part mold for selectively supporting thereon either the back or front curves employed for the molding of hydrophilic polymer contact lenses.
Figure 2:
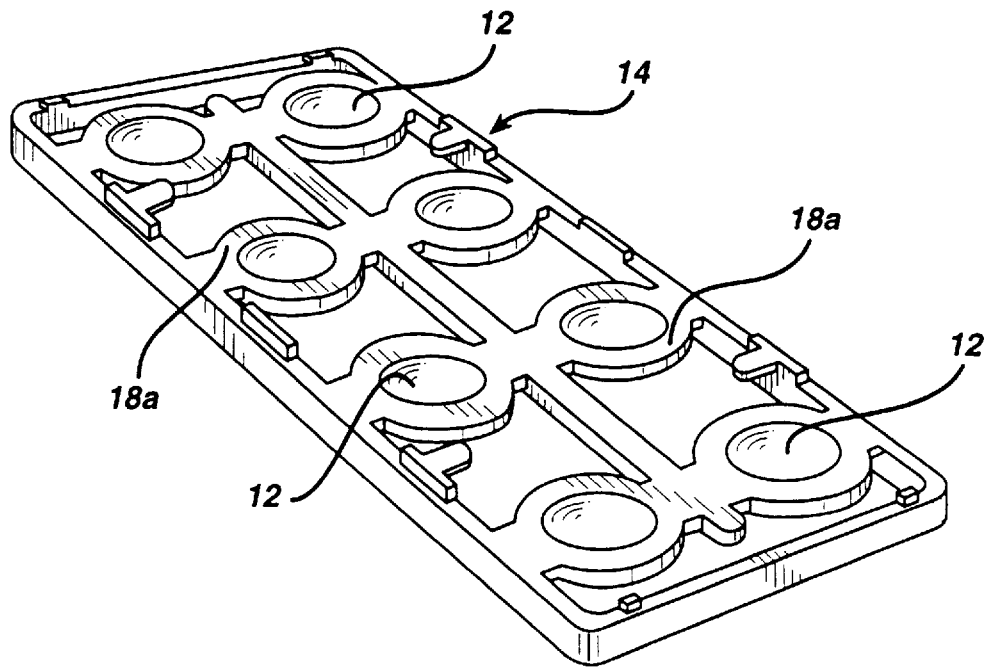
FIG. 2 illustrates a perspective view of a frame assembly of front curves for the molding of contact lenses.
Figure 3:
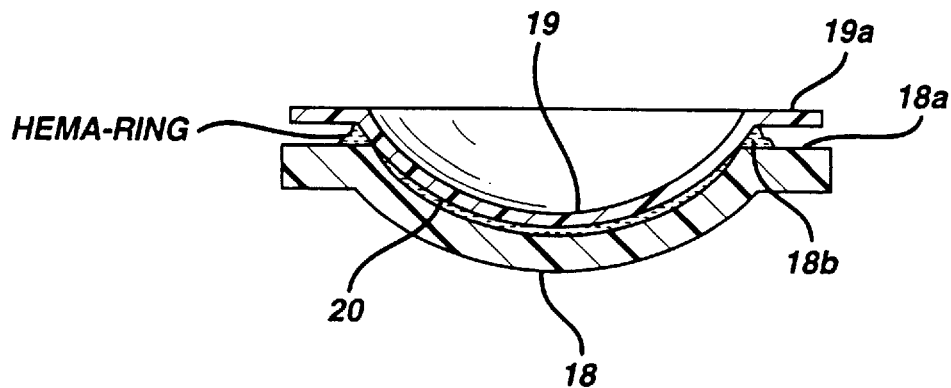
FIG. 3 illustrates a sectional, generally diagrammatic view through an assembled front curve and base curve arrangement for molding hydrophilic polymer contact lenses.

Referring now in more specific detail to FIGS. 1 to 3 of the drawings, there is illustrated a mold frame or pallet 10 of a suitable rigid material having recesses 16 which are adapted to mount front curve flanges 18 for molding, in cooperation with suitable base curves 19 each jointly forming therewith a two-part mold, in this instance, a plurality of eight hydrophilic polymer contact lenses (not shown). As is well known in the art as mentioned hereinabove, the material employed for the hydrophilic contact lenses maybe constituted of a HEMA-based (hydroxyethylmethacrylate) or equivalent material.

As shown in FIG. 2, another embodiment or modification of a mold frame or pallet 14 comprises individual concave mold units 12 forming injection points for the molding material for the plurality of contact lenses which are to be molded, and is adapted to mate with convex mold units of a two-part mold. The frame structure of mold front curves of the two-part mold are somewhat different than those contemplated in FIGS. 1 and 3, although surfactant may be applied thereto in the same manner, as described hereinbelow; and other variations thereof also readily lend themselves for use with the inventive apparatus and method.

Each concave mold unit 12 defines a front curve 18 for the containment of a monomer material for the subsequent molding of a contact leans, as shown in FIG. 3. Extending about the front curve is an integral flange 18a, joined to the front curve by means of an annular lip 18b extending about the mold cavity filled with HEMA-based lens molding material.

In order to provide the complete two-part mold, a second mold part comprising a base curve 19 is subsequently adapted to be matingly superimposed on the front curve 18, after the latter is supplied with a molding monomer, so as to form a molding cavity 20 for forming a contact lens therebetween, with the base curve 19 peripherally being seated on the annular lip 18b. The base curve 19 includes a radially outwardly extending annular flange 19a, and when parts 18, 19 are assembled, forms an annular gap with flange 18a, between which there is received excess HEMA-based molding material expelled from the molding cavity 20 so as to form a HEMA-ring which adheres to the adjoining flange surfaces.

Generally, the mold parts 18 and 19 are constituted of a suitable plastic material, such as a polyolefin including low, medium and high-density polyethylene, polypropylene, polystyrene, or other plastics which are adapted for this purpose; i.e. molding hydrophilic polymer contact lenses. Preferably, the mold part 19 is thinner and more flexible than the mold part 18. Specifics of such mold constructions, including the front curves and base curves for molding contact lenses, are known in the technology, having reference to U.S. Pat. No. 4,640,489 to Larsen, and are not discussed in more specific detail herein except as applicable to the invention.

Figure 4:
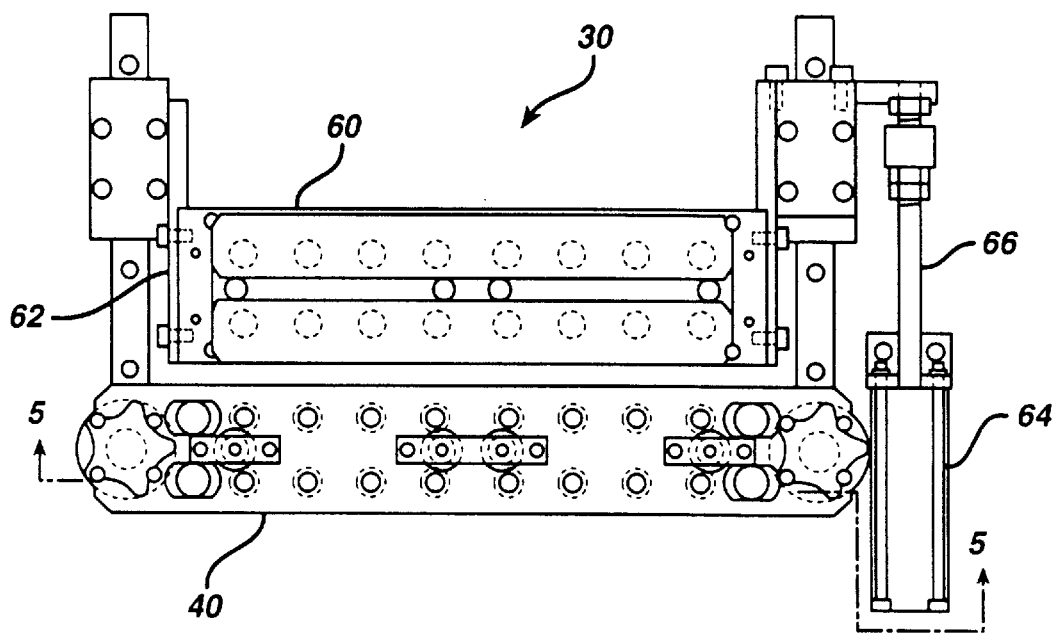
FIG. 4 diagrammatically illustrates a top plan view of a stamping station for the application of a surfactant to stamps on a stamping head and thereafter for the deposition of a film or quantity of the surfactant onto surface portions on the front curves of mold parts positioned on contact lens molding pallets.
Figure 5:
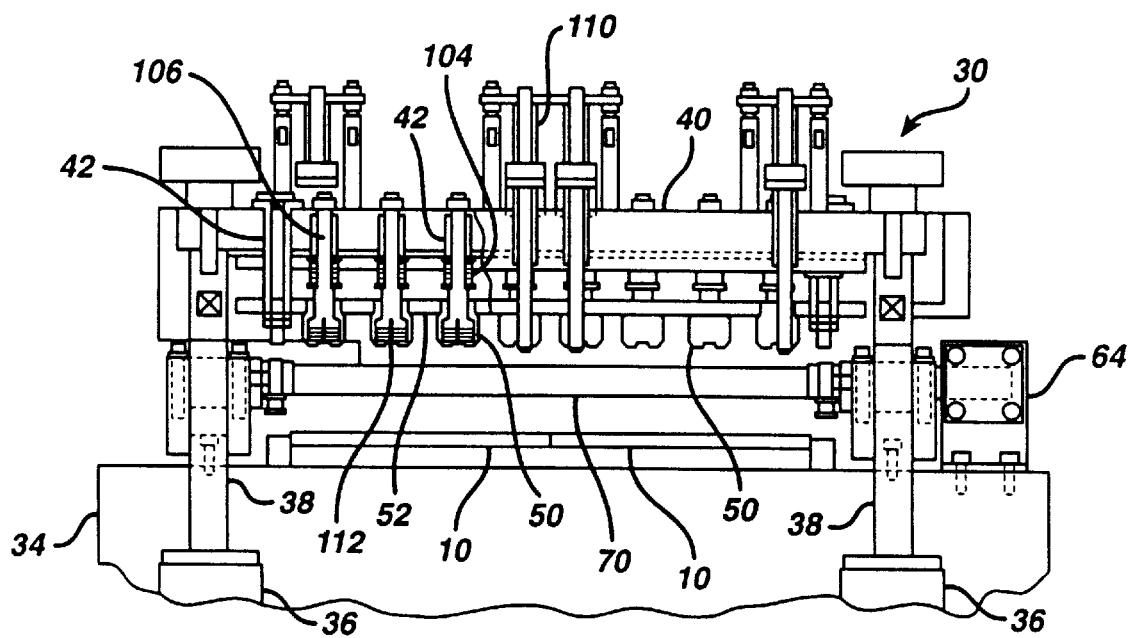
FIG. 5 illustrates an elevational sectional view of the stamping station and mechanism for selectively moving a stamp pad arrangement and molding pallets under the stamping head, taken along line 5—5 in FIG. 4.
Figure 6:
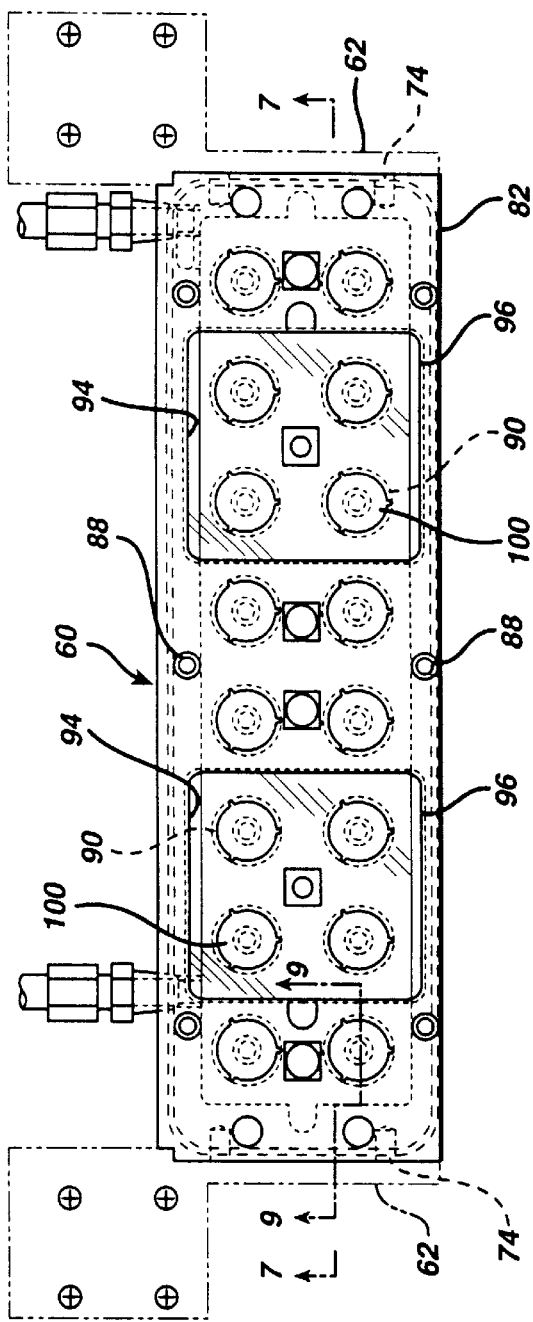
FIG. 6 illustrates a top plan view of the surfactant reservoir containing the pads of the stamp pad arrangement.
Figure 7:
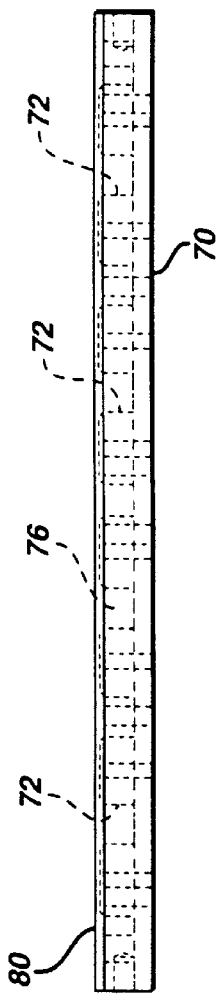
FIG. 7 illustrates a sectional view taken along line 7—7 in FIG. 6.

Referring now in greater detail to the embodiment of a stamping station as represented in FIGS. 4 through 8, and particularly the representation of FIGS. 4 and 5, there is illustrated a stamping station 30 for applying a thin film or layer of a surfactant of the type described hereinbelow, to the flange surface 18a of each respective front curve which is located in each depression 12, 16, respectively, of a pair of contiguous end-to-end positioned mold pallets 10 as shown in FIG. 1 or mold pallets 14 as shown in FIG. 2. Other types of mold pallets, of course, readily lend themselves to the invention, and the embodiments of the mold pallets are considered to be only as being generally representative by way of example.

Caution should be exercised to avoid applying surfactant to the lip 18b itself about the mold cavity, inasmuch as touching the lip with surfactant may cause a defect in the lens which is to be molded. The application of the surfactant layer or film to the surface 18a of the front curves 18 on the mold pallet 10 is intended to assist in the separation therefrom of the subsequently applied base curves 19 during demolding and in removing the HEMA-based rings which are adherent primarily to the surface of flanges 18 between the annular mold part flanges 18a, 19a at a demolding station subsequent to completion of the lens molding procedure, so as to reduce potential damage to the contact lenses being released from the mold cavities 20.

As illustrated in FIGS. 4 and 5, the stamping station 30 includes a frame structure 32 having a support member or base 34 on which there are positioned a plurality of spaced downwardly depending upright guide columns 36. These stationary guide columns 36 have slide members 38 vertically slidable therein for supporting components for a stamping head unit 40 so as to be vertically displaceable along the guide columns. The stamping head unit 40 is mounted to enable vertical reciprocation of the stamps, as described below, proximate the upper end of the columns 36 through the intermediary of suitable guide bushings 42 and slide members 38, and wherein the vertical displacement is implemented through suitable actuating elements or drive units, such as hydraulic or pneumatic actuators, which are not described in further detail herein, and which, if desired, may be operated from a suitable control and sensor unit (not shown).

The stamping head unit 40 includes mounted thereon a plurality of stamps 50 each adapted to be moved in vertical reciprocatory movement in a coordinated manner in conjunction with retainer plate element 52 mounted on the stamping head unit 40, wherein the number of stamps 50 is correlated with the number of front curves 18 located in the mold depressions 12, 16 formed in the respective mold pallet 10 or mold frame 14. Each stamp 50 consists of a rubber or composition of about 90% urethane and 10% silicone in at least the portions thereof which are adapted to contact the front curves on the mold pallet 10 or 14.

Mounted on the main frame of the apparatus so as to be horizontally slidable into and out of position beneath the stamping head unit 40 is a stamp pad arrangement 60 which is fastened to a frame structure 62 at opposite ends thereof through the intermediary of suitable fastener members, and whereby the entire frame structure 62 including the stamp pad arrangement 60 may be selectively moved into and out of position beneath the stamping head unit 40 through the activation of a pneumatic cylinder 64 and piston device 66 attached thereto at one end thereof.

In this instance, the apparatus of the stamping station 30 is of a width so as to be able to accommodate two of the mold pallets or frames 10 or 14 in contacting end-to-end relationship, in order to simultaneously accommodate sixteen mold curve parts, as is clearly indicated in FIG. 5 of the drawings, and with the stamp pad arrangement 60 being of a commensurate length and width in plan view, as shown in FIGS. 4 and 5.

In the present instance, in a modification of the apparatus illustrated in the parent application, Ser. No. 08/258,263, rather than having a continuous stamping pad which is impregnated with the surfactant, the stamp pad arrangement 60 disclosed herein consists of a reservoir 70 in the form of an upwardly opening trough-like structure, possibly containing up to a 6-week supply of surfactant, in which there are fixedly mounted a plurality of stamp pads 72, each generally of circular cross-section or cylindrical shape, reference being had specifically to FIGS. 6 through 8 of the drawings showing the detailed structure of the stamping pad arrangement 60. The reservoir 70 is basically constituted of a metallic material, such as for example, a stainless steel, having a rectangular configuration, mounted by means of suitable fasteners 74 to the actuating frame structure 62 which, in turn, is connected to the pneumatic cylinder 64 and, in a rectangular recessed portion 76 thereof includes a plurality of the generally cylindrical stamp pads 72 mounted or supported on upstanding pins 78.

Figure 8:
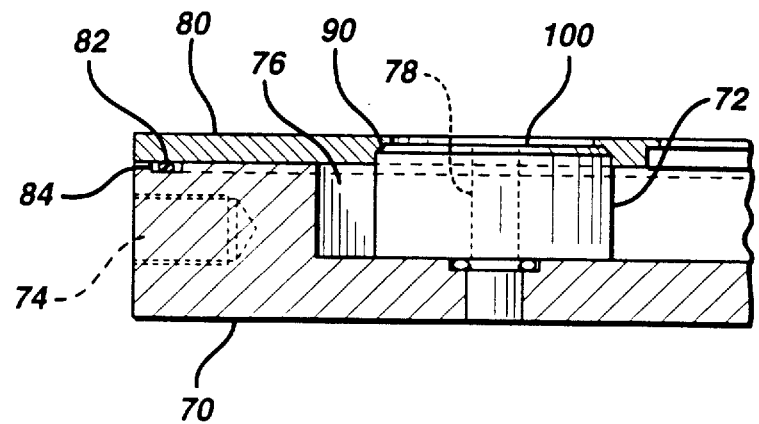
FIG. 8 illustrates, on an enlarged scale, a fragmentary detail of the reservoir taken along line 8—8 in FIG. 6.

The reservoir 70 is covered by a single generally rectangular flat plate member 80, which may also be constituted of a suitable metal such as stainless steel and which has a peripheral sealing member 82, such as an O-ring, positioned to extend between the upper perimeter of the reservoir, which may have a suitable groove 84 formed therein for receiving the O-ring or sealing member 82, and the lower surface of the plate member 80 whereby upon the plate member 80 being fastened to the reservoir 70 through suitable fasteners 88, such as screws or the like. Apertures 90 are formed in the plate member 80, located to be aligned and commensurate in number with each of the stamp pads 72, and dimensioned to contact the upper circumferential surfaces of the latter, as shown in FIG. 8, and thereby form a complete sealing arrangement for the surfactant contained in the reservoir 70.

In order to provide visual capability of inspection that there is an adequate supply of surfactant in the reservoir 70 able to be absorbed by the stamp pads 72, at least one or two surface portions 94 of the metallic plate member 80 may be cut out and suitable plates 96 of a transparent plastic material, such as Lexan (registered trademark), fixedly positioned in the cut-out areas.

The upper surface of each stamp pad 72 is covered by a filter 100, preferably of nylon, having a mesh size within the range of about 0.5 to 2.0 microns so as to act as a metering device and allow only a relatively small quantity of surfactant to pass therethrough as the surfactant is wicked from each stamp pad 72 to the top thereof upon pads being pressingly contacted by the bottom ends of the stamps 50 of stamping head unit 40, as described hereinbelow.

The shiftable stamp pad and reservoir structure 70, 72 through the horizontally displaceable nature thereof, as shown in FIG. 4 of the drawings, is adapted to be moved between the upright columns 36 and slide members 38 into position below the stamps 50 or moved outwardly away therefrom when not needed.

The foregoing stamp pad and reservoir arrangement 60, 70 and its actuating structure 64, 66 is located at an elevation or height above a mold pallet track (not shown in detail) along which the pairs of mold pallets 10 or 14 are adapted to be sequentially advanced into position below the stamping head unit 40, as shown in FIG. 5, in order to enable each of the stamps 50 to apply a thin film or coating of surfactant to the respective surfaces 18a, 18b of the front curves 18 located on the pallets before being transported further along the lens manufacturing system in connection with the forming of the contact lenses.

OPERATION OF THE APPARATUS

In order to facilitate the deposition of a thin film layer of surfactant onto the flange surface 18a of the front curves 18 on the mold pallet 10 or frame 14 which has been positioned below the stamping head unit 40, the stamping head unit 40 is maintained in a fully raised position on slide members 38. This is implemented by means of a suitable lifting cylinder arrangement (not shown) acting on slide members 38 so as to be vertically movable within the guide columns 36. The extent of vertical movement may be controlled by a suitable control and sensor arrangement (not shown). Each stamp pad 72 in its reservoir 70 is interposed in spaced relationship between a molding pallet 10 or 14 and the lower ends of the stamps 50 on the stamping head unit 40, which components are vertically aligned with each other in spaced relationship. This interposition of the stamp pads 72 is carried out by shifting the frame structure 62 through operation of cylindrical-piston device 64, 66 so as to locate the reservoir 70 beneath the stamps 50. Thereafter, the stamping head unit 40 is actuated so as to cause the stamps 50 to be each displaced downwardly into predetermined contact with the upper surface of a membrane filter 100 on an associated stamp pad 72, whereby a certain amount of surfactant is expelled upwardly through the nylon filter 100 and deposited on the lower downwardly facing surface of each stamp 50, forming a thin layer or coating of the surfactant thereon.

The surfactant contained in reservoir 70 with which each pad 72 is impregnated may be a solution with an almost 100% concentrated strength of surfactant dispersed therein so as to enable forming a layer thereof on the therewith contacting surfaces of the stamps 50. Preferably, the surfactant is constituted of Tween 80 (registered trademark); i.e. a Polysorbate 80. This is basically polyethylene oxide sorbitan mono-oleate or the like equivalent, and consists of an oleate ester of sorbitol and its anhydrides copolymerized with approximately 20 moles of ethylene oxide for each mole of sorbitol and sorbitol anhydrides; of generally the formula:

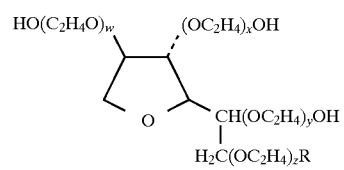

[Sum of w, x, y, z is 20; R is ($C_{17}H_{33}$)COO]

In order to ensure that a uniform layer or very thin film of the surfactant is deposited on the surface 18a of each of the front curves 18 which are located on the mold pallet 10 or 14, each stamp 50 is individually resiliently imparted to the action of a suitable biasing spring 104, preferably such as a coil spring encompassing part of a stamp rod 106 supporting the stamp 50 at a lower end thereof, thereby ensuring that notwithstanding manufacturing tolerances, a uniform pressure will be subsequently exerted by the surfactant-wetted stamps 50 against all contacting surfaces 18a, 18b on the front curves 18 which are located on the mold pallets. Upon the surfactant having been wicked up through each stamp pad 72, expelled through the respective nylon filter 100 and deposited on the lower surface of each stamp 50, the stamping head unit 40 and stamps 50 are displaced upwardly, and the stamp pad arrangement 60 with its reservoir 70 is moved horizontally by means of the piston-cylinder device 64, 66 out of the stamping station 30 from its position between the guide columns 36, thereby freeing the space between the stamps 50 and the therewith aligned front curves 18 on mold pallet 10 or 14. Thereafter, the stamps 50 and the stamping head unit 40 are again shifted downwardly along the vertical guide columns 36 by means of slides 38 until the stamps 50 have their surfactant-wetted lower end surfaces contact the surfaces 18a, 18b on the front curves 18, thereby depositing a thin layer or film of the surfactant thereon, with such layer being at a uniform thickness on each respective front curve surface 18a, 18b due to resilient biasing forces being exerted by each of the springs 110 acting on the respective stamps 50.

Subsequently, the stamps of the stamping head unit 40 are again moved vertically upwardly and a subsequent set of molding pallets 10 or frames 14 mounting front curves 18 advanced into the stamping station of the apparatus, while the preceding molding pallet 10 or frame 14 which has the front curve surface thereon already treated with the surfactant is advanced out of the stamping station so as to be mated with base curves 19, as is known in the art. The process may then be repeated with the subsequently introduced front curves 18 on mold pallets 10 or frames 14 in the same continuous manner.

The foregoing structure enables the deposition of a thin and uniform layer or film of the surfactant onto specified flange surface 18a of the front curves 18 so as to enable easier subsequent separation of the base curves 19 therefrom and removal of the HEMA-based ring material excessed during the molding of the hydrophilic polymer contact lenses, upon completion of the molding sequence, and in the absence of damage being encountered by the molded contact lenses being released from the separated mold parts.

Figure 9:
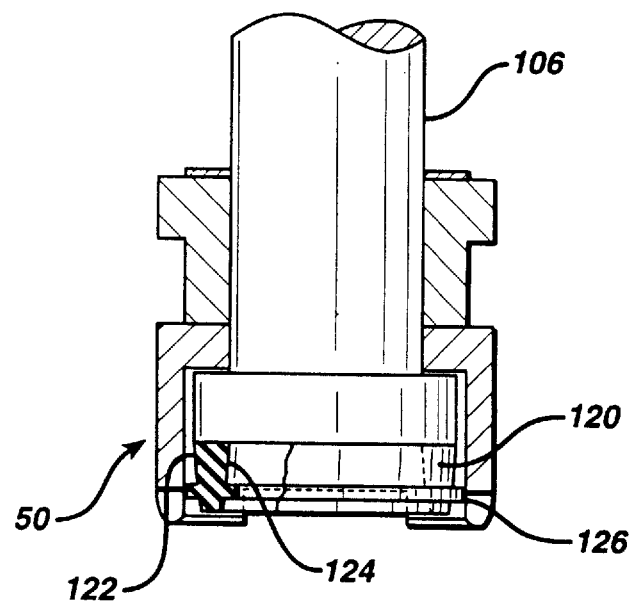
FIG. 9 illustrates, generally diagrammatically, an alternate embodiment of a stamp for applying the surfactant to the lens mold.

Although in the foregoing described embodiment of the apparatus, each rubber stamp 50 is shown as a dished element fastened to its associated shaft or rod element 106 and actuating construction by means of a screw member 112, having specific reference to FIG. 5 of the drawings; pursuant to an alternative embodiment, as shown in FIG. 9 of the drawings, rather than being fastened by means of a screw element, each rubber stamp 120 may comprise an annular ring, with a widening or wedge-like annular flange portion 122 adapted to be forced into a similarly configured complimentary groove structure 124 formed in the end of its support rod 126, thereby clampingly engaging the rubber stamp while eliminating the need for any screw member, the latter of which could conceivably loosen or fall off during continuous and repetitive operation of the apparatus. This press-fitted engagement of the resilient rubber stamp 120 by its flange 122 in the groove 124 ensures the firm engagement thereof while eliminating a loosenable fastening component and simplifying the structure thereof.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An apparatus for applying a surfactant to at least one surface of a mold part of a two-part mold having said first mold part engageable with a cooperative second mold part for the molding of polymer articles, wherein said surfactant assists in the release between said first and second mold parts and enables removal of excess polymer molding material adherent to said at least one surface of said first mold part; said apparatus comprising:

a) support means mounting at least one said first mold part being movable to a predetermined location in said apparatus;

b) applicator means including at least one surfactant applicator being arranged in spaced relationship above said support means, said at least one surfactant applicator being positionable in vertical alignment with said at least one first mold part;

c) means mounting an upwardly opening reservoir containing a surfactant being interposable between said applicator means and said support means for said at least one first mold part at least one pad member arranged in said reservoir for absorbing surfactant from said reservoir;

d) actuating means for imparting a vertical downward displacement to said applicator means to cause said at least one surfactant applicator to contact said at least one pad member and assume a quantity of said surfactant therefrom, said actuating means thereafter imparting a vertical upward displacement to said applicator means;

e) means for displacing said reservoir mounting means from the interposition thereof in said apparatus between said applicator means and said at least one first mold part, said actuating means for said applicator means displacing said applicator means downwardly to an extent such that the surfactant-wetted surface portions of said at least one surfactant applicator contact said at least one surface of said first mold part so as to impart a coating of said surfactant thereto and f) a cover member fixedly positioned on said reservoir having at least one aperture formed in said cover member in alignment with said at least one pad member to enable said at least one surfactant applicator to contact said at least one pad member.

2. An apparatus as claimed in claim 1, wherein said at least one pad member sealingly contacts against a lower surface of said cover member adjacent the circumference of said at least one aperture.

3. An apparatus as claimed in claim 2, wherein seal means extends about said reservoir and a lower surface of said cover member so as to prevent surfactant from spilling out of said reservoir during operation of said apparatus.

4. An apparatus as claimed in claim 3, wherein said seal means is positioned in a groove formed in the lower surface of said cover member.

5. An apparatus as claimed in claim 3, wherein said seal means comprises an O-ring seal.

6. An apparatus as claimed in claim 1, wherein said cover member comprises a flat plate having at least one transparent surface portion to enable visual viewing of the contents of said reservoir.

7. An apparatus as claimed in claim 6, wherein said transparent surface portion is constituted of a rigid transparent plastic material.

8. An apparatus claimed in claim 1, wherein a plurality of said first mold parts are mounted in predetermined spaced relationship on said support means each in vertical alignment with respectively one surfactant applicator of a plurality of said applicators, a plurality of said pad members being discretely located in said reservoir each in alignment with respectively one of said surfactant applicators, and a plurality of said apertures being formed in said cover member each in alignment with respectively one of said pad members.

9. An apparatus as claimed in claim 1, wherein said applicator means comprises stamping means and said at least one surfactant applicator comprises a stamp.

10. An apparatus as claimed in claim 9, wherein said actuating means raises said stamping means upwardly into the initial position thereof subsequent to imparting the layer of said surfactant to said at least one surface of said first mold part; and operative means displaces said support means for said at least one first mold part and successively conveys further mold support means mounting at least one other said first mold part into said location in said apparatus.

11. An apparatus as claimed in claim 10, wherein said means mounting said at least one pad member comprises operative means for alternatingly positioning said at least one pad member beneath said stamping means and withdrawing said at least one pad member from said location in said apparatus to enable said at least one stamp to advance downwardly into contact with said at least one surface of said at least one first mold part.

12. An apparatus as claimed in claim 1, wherein said at least one pad member comprises a porous member absorptive of a solution in said reservoir containing said surfactant.

13. An apparatus as claimed in claim 1, wherein an upper surface of said at least one pad member facing said at least one surfactant applicator means is covered by a membrane filter having a mesh size with openings within the range of about 0.5 to 2.0 microns.

14. An apparatus as claimed in claim 13, wherein said membrane filter is a nylon filter controlling the amount of surfactant expelled upwardly through said filter response to being contacted by said at least one surfactant applicator so as to deposit a predetermined quantity of said surfactant on contacting surface portions of said at least one surfactant applicator.

15. An apparatus as claimed in claim 1, wherein at least the surface portions of said at least one surfactant applicator contacting said at least one pad member operatively associated therewith for assuming surfactant therefrom is constituted from rubber or a compound comprising about 90% urethane and 10% silicone.

16. An apparatus as claimed in claim 1, further comprising a plurality of said first mold parts mounted on said support means, each said first mold part comprising a front curve for molding a hydrophilic polymer contact lens and an encompassing flange portion, each said mold means being operatively aligned with respectively one of a plurality of said surfactant applicator whereby contact between said front curve and an associated surfactant applicator transfers a thin film of said surfactant to a facing surface on said flange portion about said front curve from said surfactant applicator so as to thereby at a subsequent demolding operation facilitating detaching of a second mold part comprising a base curve for said lens and a ring of excess molding material adhesively deposited on the surfaces of said flange portion about said front curve.

17. An apparatus as claimed in claim 16, wherein said support means for said first mold parts comprises at least one mold pallet.

18. An apparatus as claimed in claim 16, wherein spring means resiliently mount each said surfactant applicator on said applicator means to enable each said surfactant applicator to floatingly displace relative to each other upon contacting said respective front curve so as to ensure an even contact to be applied to each said front curve and impart a uniform layer of said surfactant to each said front curve.

19. An apparatus as claimed in claim 1, wherein said at least one surfactant applicator comprises an annular member mounted in an end surface of said applicator means adapted to face said at least one pad member and surface on said at least on first mold part.

20. An apparatus as claimed in claim 19, wherein said end surface comprises an annular groove for clampingly receiving said surfactant applicator.

21. An apparatus as claimed in claim 1, wherein said surfactant comprises a polyethylene oxide sorbitan monooleate.

22. An apparatus as claimed in claim 1, wherein said surfactant comprises an oleate ester of sorbitol and its anhydrides copolymerized with approximately 20 moles of ethylene oxide for each mole of sorbitol and sorbitol anhydrides, of generally the formula:

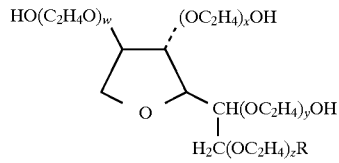

[Sum of w, x, y, z is 20; R is $(C_{17}H_{33})COO$].

23. A method for applying a surfactant to at least one surface of at least one first mold part of a two-part mold utilized for the molding of polymer articles so as to facilitate disengagement between said first mold part from a second mold part and the removal of any excess molding material present on said at least one surface on said first mold part, said method comprising the steps of:
    a) moving support means mounting said at least one first mold part to a predetermined location;
    b) arranging applicator means including at least one surfactant applicator in spaced relationship above said support means, and positioning said at least one surfactant applicator in vertical alignment with said at least one first mold part;
    c) coating said at least one surfactant applicator with a layer of surfactant by contacting at least one pad member located in a reservoir containing a supply of said surfactant;
    d) withdrawing said reservoir containing said at least one pad member to a position offset from said at least one surfactant applicator; and
    e) displacing said applicator means downwardly to an extent such that surfactant-wetted surface portions of said at least one surfactant applicator contact the at least one surface on said at least one first mold part to impart a coating of said surfactant to said surface.

24. A method as claimed in claim 23, wherein said applicator means comprises stamping means and said at least one surfactant applicator comprises a stamp.

25. A method as claimed in claim 24, wherein said stamping means is raised upwardly into the initial position thereof subsequent to coating said surfactant on said at least one first mold part; and displacing said support means from and inserting at least one successive support means into position at said location.

26. A method as claimed in claim 24, wherein at least the surface portions of said at least one stamp contacting said at least one pad member for assuming surfactant therefrom is constituted from rubber or a compound comprising about 90% urethane and 10% silicone.

27. A method as claimed in claim 26, wherein each said stamp is resiliently mounted on said stamping means to enable each said stamp to floatingly displace relative to each other upon contacting said respective surface in the flange about the front curve so as to ensure an even contact to be applied thereto and to impart a uniform coating of said surfactant to each said surface.

28. A method as claimed in claim 24, wherein a plurality of said first mold parts are mounted on said support means forming at least one pallet, each said first mold parts comprising a front curve and encompassing flange portion for molding a hydrophilic polymer contact lens, each said first mold parts being operatively aligned with respectively one said stamp whereby contact between the facing surface on said flange portion of the front curve and an associated stamp transfers a thin film of said surfactant to said surface from said stamp, thereby facilitating subsequent release of a second mold part forming a base curve for molding said leans and a ring of molding material adhesive deposited on said flange surface.

29. A method as claimed in claim 23, comprising alternatingly positioning at least one said pad member beneath said stamping means and withdrawing said pad member from said location to enable said at least one stamp to advance downwardly into contact with said at least one surface on said at least one first mold part.

30. A method as claimed in claim 29, wherein said at least one pad member comprises a porous member absorptive of a solution of said surfactant.

31. A method as claimed in claim 30, wherein an upper surface of said porous member is covered by a membrane filter having a mesh size with openings within the range of about 0.5 to 2.0 microns.

32. A method as claimed in claim 31, wherein said filter is a nylon filter controlling the amount of surfactant passed outwardly through said filter in response to pressure exerted thereon by said at least one stamp upon being contacted thereby so as to deposit a predetermined quantity of said surfactant on said at least one stamp.

33. A method as claimed in claim 23, wherein said surfactant comprises a polyethylene oxide sorbitan monooleate.

34. A method as claimed in claim 23, wherein said surfactant comprises an oleate ester of sorbitol and its anhydrides copolymerized with approximately 20 moles of ethylene oxide for each mole of sorbitol and sorbitol anhydrides, of generally the formula:

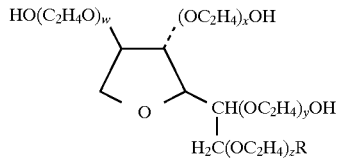

[Sum of w, x, y, z is 20; R is $(C_{17}H_{33})COO$].

35. A method as claimed in claim 23, wherein about 0.05 to 0.50 mg of surfactant is applied to each said surface of said one mold part.

36. A method as claimed in claim 23, wherein a cover member having at least one aperture for said at least one pad member is sealingly mounted over said reservoir.

37. A method as claimed in claim 36, wherein said cover member is provided with transparent surface portions to enable viewing of the contents of said reservoir.

* * * * *

UNITED STATES PATENT AND TRADEMARK OFFICE
CERTIFICATE OF CORRECTION

PATENT NO. : 5,837,314
DATED : November 17, 1998
INVENTOR(S) : Beaton, et al.

It is certified that error appears in the above-indentified patent and that said Letters Patent is hereby corrected as shown below:

Column 15 - Line - 10 - delete "leans" and insert "lens"

Signed and Sealed this

Sixth Day of July, 1999

*Attest:*

Q. TODD DICKINSON

*Attesting Officer*      *Acting Commissioner of Patents and Trademarks*